United States Patent
Fügel et al.

(10) Patent No.: US 9,410,334 B2
(45) Date of Patent: Aug. 9, 2016

(54) MOBILE CONCRETE PUMP WITH DISTRIBUTING BOOM AND SUPPORT DEVICE

(71) Applicant: Putzmeister Engineering GmbH, Aichtal (DE)

(72) Inventors: Dietmar Fügel, Wolfschlugen (DE); Andreas Benz, Wendlingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 14/879,839

(22) Filed: Oct. 9, 2015

(65) Prior Publication Data
US 2016/0032602 A1 Feb. 4, 2016

Related U.S. Application Data

(63) Continuation of application No. PCT/EP2014/053777, filed on Feb. 27, 2014.

(30) Foreign Application Priority Data

Apr. 11, 2013 (DE) .................. 10 2013 206 366

(51) Int. Cl.
*E04G 21/04* (2006.01)
*B66C 23/80* (2006.01)
*B60S 9/02* (2006.01)

(52) U.S. Cl.
CPC ............... *E04G 21/0445* (2013.01); *B60S 9/02* (2013.01); *B66C 23/80* (2013.01); *E04G 21/0436* (2013.01)

(58) Field of Classification Search
CPC ........ B66C 23/78; B66C 23/80; E04G 21/04; E04G 21/0436; E04G 21/0445; B60S 9/02
USPC ...................... 280/763.1, 764.1, 765.1, 766.1
See application file for complete search history.

(56) References Cited

U.S. PATENT DOCUMENTS 3,101,150 A * 8/1963 Arvid ................. B62D 49/0678
180/12
3,707,990 A * 1/1973 Schaible ................... B60P 1/36
137/615

(Continued)

FOREIGN PATENT DOCUMENTS

CN 102442281 A 5/2012
CN 202573937 U 12/2012

(Continued)

OTHER PUBLICATIONS

English translation of the International Preliminary Report on Patentability, PCT/EP2014/053777, dated Oct. 15, 2015.

*Primary Examiner* — Hau Phan
*Assistant Examiner* — Jacob Meyer
(74) *Attorney, Agent, or Firm* — Bose McKinney & Evans LLP

(57) ABSTRACT

A mobile concrete pump with a support structure, which can be placed on a vehicle frame of a truck chassis, for receiving functional units which form a support device and a distributing boom. The functional unit which forms the distributing boom has a rotary head mounted on a boom pedestal in a rotatable manner about a vertical axis, the boom pedestal being secured to the support structure, and the boom pedestal comprises a tank which engages into the support structure and is provided as a rotary bearing for the rotary head. Each functional unit which forms the support device has a support leg mounted in a bearing in a pivotal and/or telescopable manner, the bearing being secured to the support structure. A tank wall of the tank tapering from the top to the bottom in a truncated cone-like manner or in a truncated pyramid-like manner in the cross section, engages into the support structure and is rigidly secured, preferably welded, into the support structure.

8 Claims, 3 Drawing Sheets

(56) References Cited

U.S. PATENT DOCUMENTS

| | | | | |
|---|---|---|---|---|
| 3,964,512 A * | 6/1976 | Dumas | B65G 53/30 | 137/615 |
| 4,043,441 A * | 8/1977 | Johnson | B60P 1/40 | 198/317 |
| 4,138,162 A * | 2/1979 | Noren | B65G 53/14 | 406/61 |
| 4,280,771 A * | 7/1981 | Schwing | E21D 11/105 | 405/148 |
| 4,397,396 A * | 8/1983 | Kay | B66C 23/78 | 212/195 |
| 4,496,062 A * | 1/1985 | Gattu | B66C 23/78 | 212/302 |
| 4,624,357 A * | 11/1986 | Oury | E04G 21/04 | 198/313 |
| 4,798,510 A * | 1/1989 | Lazenby | B65D 88/30 | 222/168 |
| 5,158,420 A * | 10/1992 | Weyer | E02F 3/303 | 414/694 |
| 6,068,025 A * | 5/2000 | Schlecht | E04G 21/04 | 138/109 |
| 6,142,180 A * | 11/2000 | Woodling | B66C 23/42 | 137/615 |
| 6,230,741 B1 * | 5/2001 | Woodling | B66C 23/42 | 137/615 |
| 6,378,686 B1 * | 4/2002 | Mayer | B65G 21/14 | 198/311 |
| 6,675,822 B1 * | 1/2004 | Schmitz | E04G 21/04 | 137/15.09 |
| 6,786,233 B1 * | 9/2004 | Anderson | B66C 23/64 | 137/615 |
| 6,811,161 B1 * | 11/2004 | Anderson | E06C 5/04 | 182/19 |
| 6,840,540 B2 * | 1/2005 | Fugel | B66C 23/80 | 280/763.1 |
| 6,871,667 B2 * | 3/2005 | Schwing | E04G 21/04 | 137/615 |
| 6,948,701 B2 * | 9/2005 | Knoerzer | H02G 1/08 | 254/134.3 FT |
| 7,328,810 B1 | 2/2008 | Rhodes | | |
| 7,478,834 B2 * | 1/2009 | Schlecht | B66C 23/42 | 280/763.1 |
| 7,591,089 B2 * | 9/2009 | Keany | E02F 3/3677 | 37/403 |
| 7,909,059 B2 * | 3/2011 | Wehner | B66C 23/78 | 137/615 |
| 8,224,577 B2 * | 7/2012 | Gelies | B66C 13/40 | 701/50 |
| 8,282,130 B2 * | 10/2012 | Fuegel | B62D 53/04 | 280/763.1 |
| 8,366,148 B2 * | 2/2013 | Benz | B62D 21/186 | 212/302 |
| 8,752,710 B2 * | 6/2014 | Frost | B07B 1/005 | 108/103 |
| 8,794,670 B2 * | 8/2014 | Fuegel | B66C 23/80 | 280/763.1 |
| 9,062,465 B2 * | 6/2015 | Neubert | E04G 21/0418 | |
| 9,068,366 B2 * | 6/2015 | Petzold | B66C 23/78 | |
| 9,175,484 B2 * | 11/2015 | Fuegel | E04G 21/0445 | |
| 2003/0038466 A1 * | 2/2003 | Fugel | B66C 23/80 | 280/765.1 |
| 2008/0142464 A1 * | 6/2008 | Fugel | B66C 23/78 | 212/349 |
| 2009/0052996 A1 * | 2/2009 | Sykora | B65G 53/32 | 406/157 |
| 2009/0283163 A1 * | 11/2009 | Wehner | B66C 23/78 | 137/615 |
| 2010/0253044 A1 * | 10/2010 | Benz | B62D 21/186 | 280/433 |
| 2010/0264635 A1 * | 10/2010 | Fuegel | B62D 53/04 | 280/763.1 |
| 2012/0132606 A1 * | 5/2012 | Larsen | B66C 23/78 | 212/302 |
| 2014/0096853 A1 * | 4/2014 | Neubert | E04G 21/0418 | 137/615 |
| 2014/0325976 A1 * | 11/2014 | Schabelreiter | B66C 23/54 | 60/477 |
| 2015/0056084 A1 * | 2/2015 | Fuegel | E04G 21/0445 | 417/234 |
| 2015/0110544 A1 * | 4/2015 | Gerlof | B60S 9/02 | 403/104 |
| 2015/0176608 A1 * | 6/2015 | Fuegel | E04G 21/04 | 280/830 |
| 2015/0204089 A1 * | 7/2015 | Ruppel | E04G 21/0436 | 248/558 |
| 2015/0316043 A1 * | 11/2015 | Braun | E04G 21/04 | 417/437 |
| 2015/0376908 A1 * | 12/2015 | Braun | E04G 21/0445 | 248/49 |
| 2016/0002937 A1 * | 1/2016 | Braun | E04G 21/0445 | 248/49 |
| 2016/0025128 A1 * | 1/2016 | Fugel | E04G 21/0436 | 280/763.1 |
| 2016/0032602 A1 * | 2/2016 | Fugel | B66C 23/80 | 248/49 |
| 2016/0047133 A1 * | 2/2016 | Westermann | E04G 21/0436 | 137/343 |

FOREIGN PATENT DOCUMENTS

| | | |
|---|---|---|
| DE | 100 32 622 A1 | 1/2002 |
| DE | 20 2007 002 114 U1 | 4/2007 |
| DE | 10 2007 060 526 A1 | 6/2009 |
| DE | 10 2008 007 917 A1 | 8/2009 |

* cited by examiner

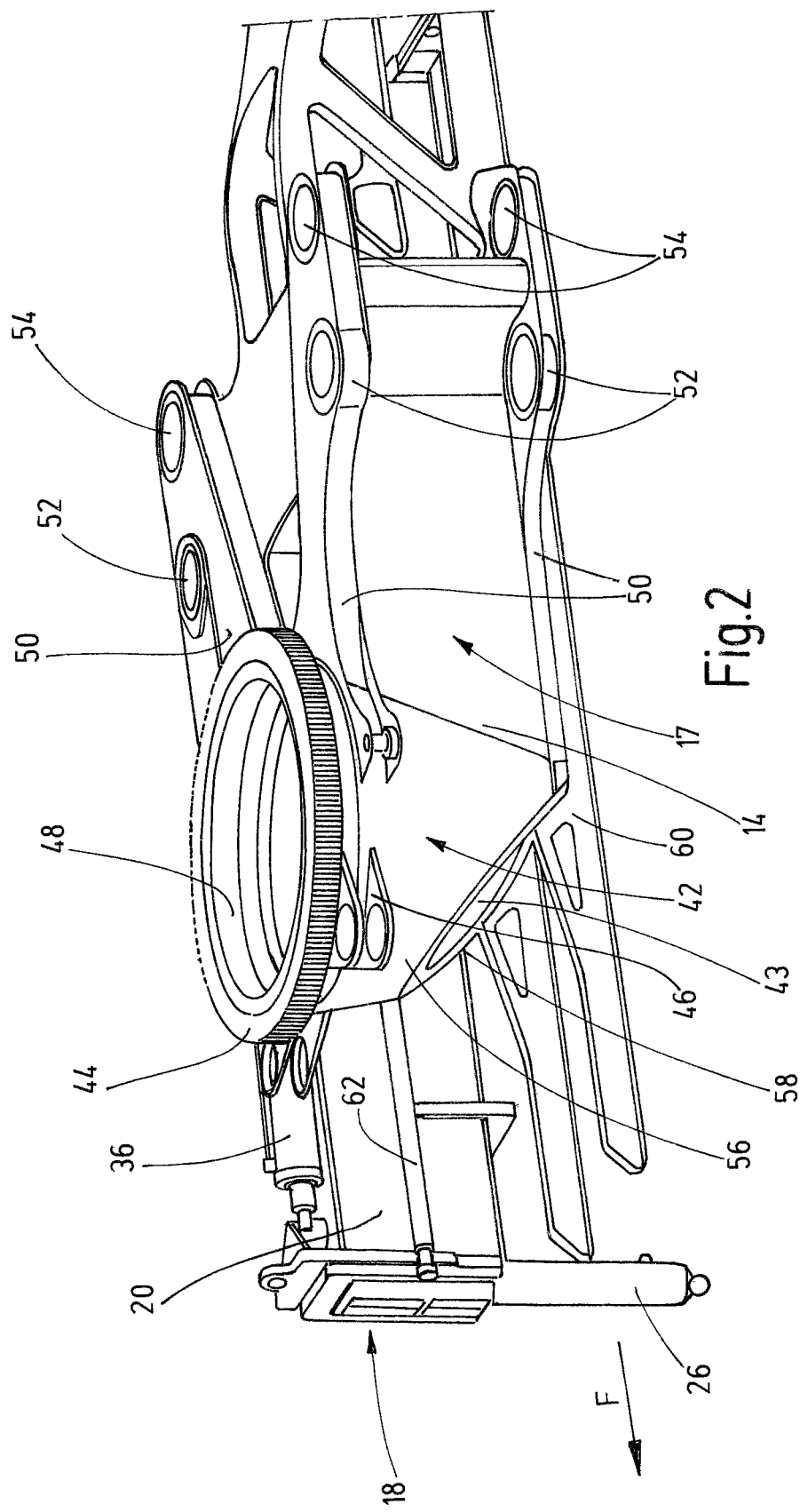

MOBILE CONCRETE PUMP WITH DISTRIBUTING BOOM AND SUPPORT DEVICE

RELATED APPLICATIONS

This application is a continuation of PCT/EP2014/053777, filed Feb. 27, 2014, which claims priority to DE 10 2013 206 366.0, filed Apr. 11, 2013, both of which are hereby incorporated herein by reference in their entireties.

BACKGROUND

The invention relates to a mobile concrete pump with a support structure which can be placed on a vehicle frame of a truck chassis for receiving functional units which form a support device and a distributing boom, wherein the functional unit which forms the distributing boom has a rotary head mounted on a boom pedestal in a rotatable manner about a vertical axis, said boom pedestal being secured to the support structure, and the boom pedestal comprises a shell which engages in the support structure and is provided as a rotary bearing for the rotary head, and wherein the functional units forming the support device have one respective support leg mounted in a bearing in a pivotable and/or telescopable manner, said bearing being secured to the support structure.

Mobile concrete pumps are known from DE-100 32 622 A1. The purpose of the support structure is to introduce the weight and the load moment of the distributing boom into the ground via the support device. Generally, the support device comprises four support legs which are articulated on the support structure and which may be supported on the ground via hydraulic cylinders. The interface between the distributing boom and the support device forms the shell as a central component of the boom pedestal, the rotary head of the distributing boom being attached thereto via a rotary bearing and a drive mechanism. The shell is a component which is subjected to high loads and which has to absorb the loads of the distributing boom and forward the loads to the support legs. Generally, the shell is designed to be cylindrical or polygonal about the rotational axis of the distributing boom. All known shells have the common property that the cross section does not alter over the height thereof. It has been shown that this design with a fixed cross section over the height is not constructed to be load-compatible.

SUMMARY

Proceeding therefrom, this disclosure teaches a mobile concrete pump that in the region of its support structure is more lightweight and more space-saving and nevertheless load-compatible.

The solution according to this disclosure is based on the idea that a lightweight and nevertheless load-compatible construction is produced if the shell tapers from top to bottom in cross section. Accordingly, according to this disclosure it is proposed that the shell, with its shell wall which tapers in cross section from top to bottom in the manner of a truncated cone or truncated pyramid, engages in the support structure and is rigidly inserted therein.

The construction according to this disclosure saves unnecessary material consumption and thus lowers the component weight and thus also the machine weight. The shape which tapers from top to bottom provides space between the support structure and the boom pedestal, the necessary installations being able to be accommodated in a space-saving manner therein, in particular in support structures with four pivoting legs. Advantageously, telescopic cylinders for telescopic pivoting legs may be accommodated in the constructional space saved, hitherto said legs having to be accommodated in the interior of the telescopic legs in a manner which was complex, costly and only accessible with difficulty. This gaining of space is particularly important in large machines.

One embodiment disclosed herein provides that the shell has a vertical through-opening for the passage of a concrete conveying line.

A further advantageous embodiment disclosed herein provides that bearing arms forming part of the support structure are welded onto the shell, said bearing arms having bearing eyes arranged spaced apart from the shell wall, in each case one of the support legs being pivotably mounted thereon about a vertical axis.

A further reduction of the material consumption may be achieved in that the shell wall forms a truncated cone or a truncated pyramid with an abutment surface which is open downwardly and rises obliquely in the direction of travel of the concrete pump. The shell may be supported in this case by its oblique abutment surface on a support frame of the support structure rising obliquely in the direction of travel.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIGS. 2 and 3 show in each case a diagrammatic view of the support structure of the mobile concrete pump according to FIGS. 1a and b, with a support leg of the support device and the shell arranged in the boom pedestal of the support structure.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

It should be understood that terms such as "horizontal" and "vertical" appearing in this disclosure are used to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "support leg," "bearing," "drive motor," to name just a few, should be interpreted when appearing in this disclosure and claims to mean "one or more" or "at least one." All other terms used herein should be similarly interpreted unless it is made explicit that a singular interpretation is intended.

Figure 1A:
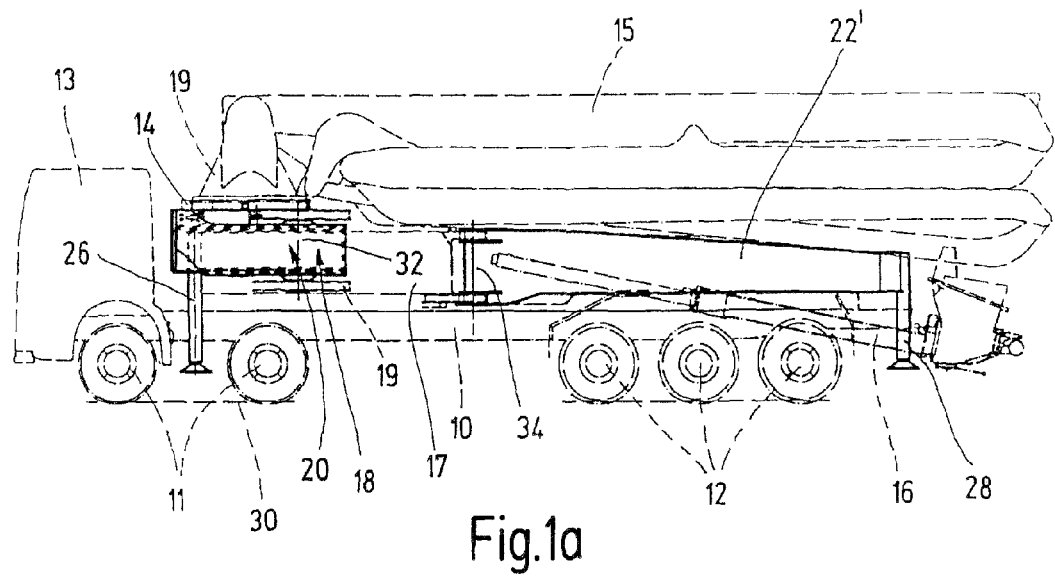
FIGS. 1a and b show a side view and a plan view of a mobile concrete pump with a distributing boom and an extension device.
Figure 1B:
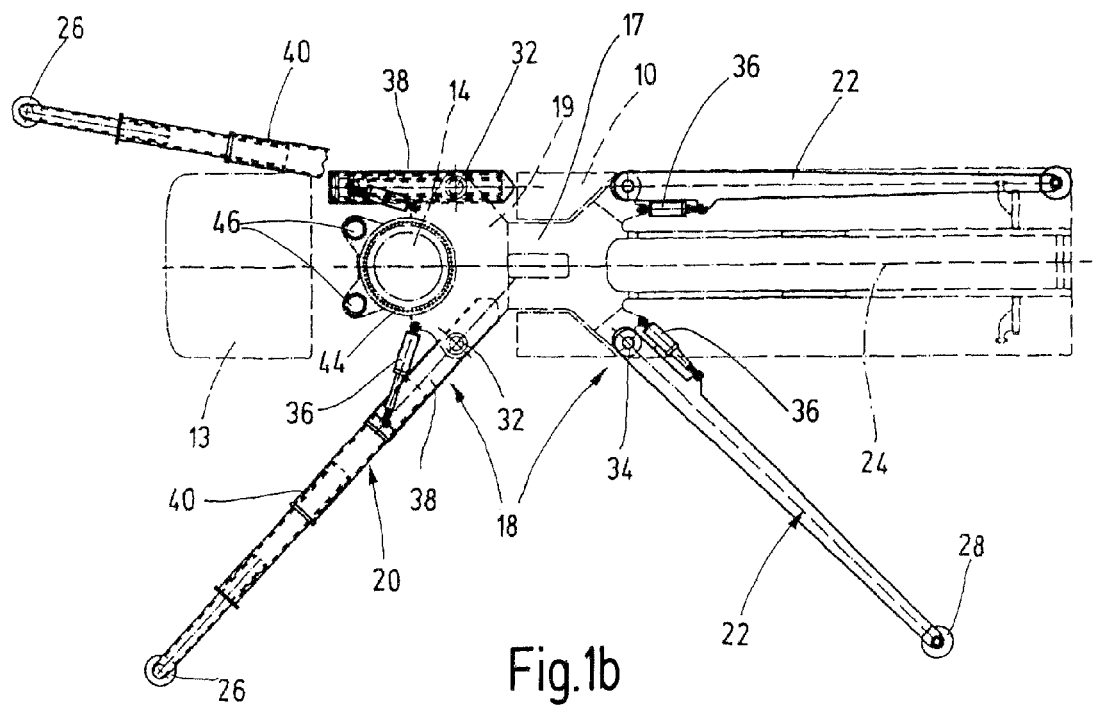

The mobile concrete pump shown in FIGS. 1a and b substantially consists of a multi-axle vehicle frame 10 with two front axles 11 and three rear axles 12 with a driver's cab 13, a concrete distributing boom 15 which is rotatably mounted on a boom pedestal 14 in the vicinity of the front axle by means of a rotary head 19 about a vertical axis, with a pump arrangement 16 mounted at a distance from the boom pedestal 14 on the vehicle frame 10, as well as a support structure 17 for a support device 18 placed on the vehicle frame 10. The support device 18 comprises two front support legs 20 and two rear support legs 22, 22' which are articulated to the support structure 17. The support legs are retracted in the transport position and aligned parallel with the vehicle longitudinal axis 24, whilst in the support position they protrude obliquely to the front and/or to the rear over the vehicle frame 10 and are supported on the ground 30 by their foot parts 26, 28. In this case, the front support legs 20 are pivotable about their vertical pivot axes 32 and the rear support legs 22, 22' are pivotable about their vertical pivot axes 34, relative to the support structure 17 between the transport position and the support position by the action of one respective extension cylinder 36. In principle, in a modified exemplary embodiment it is also possible for the front and rear support legs 20, 22, 22' adjacent to one another to be pivoted via a common drive. Additionally, the front support legs 20 are designed as telescopic struts. As is visible, in particular, in FIG. 1b, in each case the support legs comprise a strut body 38 which is pivotable about the vertical pivot axis 32 relative to the support structure 17 and a telescopic part 40 consisting of three telescopic tubes.

A central component of the boom pedestal 14 is the shell 42 which forms the interface between the distributing boom 15 and the support device 18. The rotary head 19 of the distributing boom is positioned from the top onto the shell 42 and rotatably mounted here about a vertical axis. The drive takes place via a toothed ring 44 rigidly arranged on the rotary head 19 and rotatably mounted on the shell via a rolling bearing, by means of two hydraulic or electrical drive motors 45 which engage with a drive pinion 57 in the toothed ring 44. The drive motors 45 are arranged on lugs 46 of the boom pedestal fixed to the shell. The shell has a vertical through-opening 43 for the passage of a concrete conveying line, not shown. As the shell forms a vertical bearing for the distributing boom 15, it absorbs the load over its height. The load is at a maximum at the upper end in the vicinity of the rotary bearing 48 and reduces downwardly.

The shape of the shell 42 is adapted to the load path, in that its cross section tapers conically from top to bottom. This construction saves unnecessary material consumption and lowers the component weight and thus also the machine weight. The conical shape also provides space between the support legs 20 and the boom pedestal 14 for accommodating the required installations. In particular, the telescopic cylinder 62 for the telescopable support legs 20 may be accommodated in the constructional space gained, hitherto said support legs only being able to be accommodated in the interior of the telescopic legs in a manner which was not easily accessible.

Figure 3:
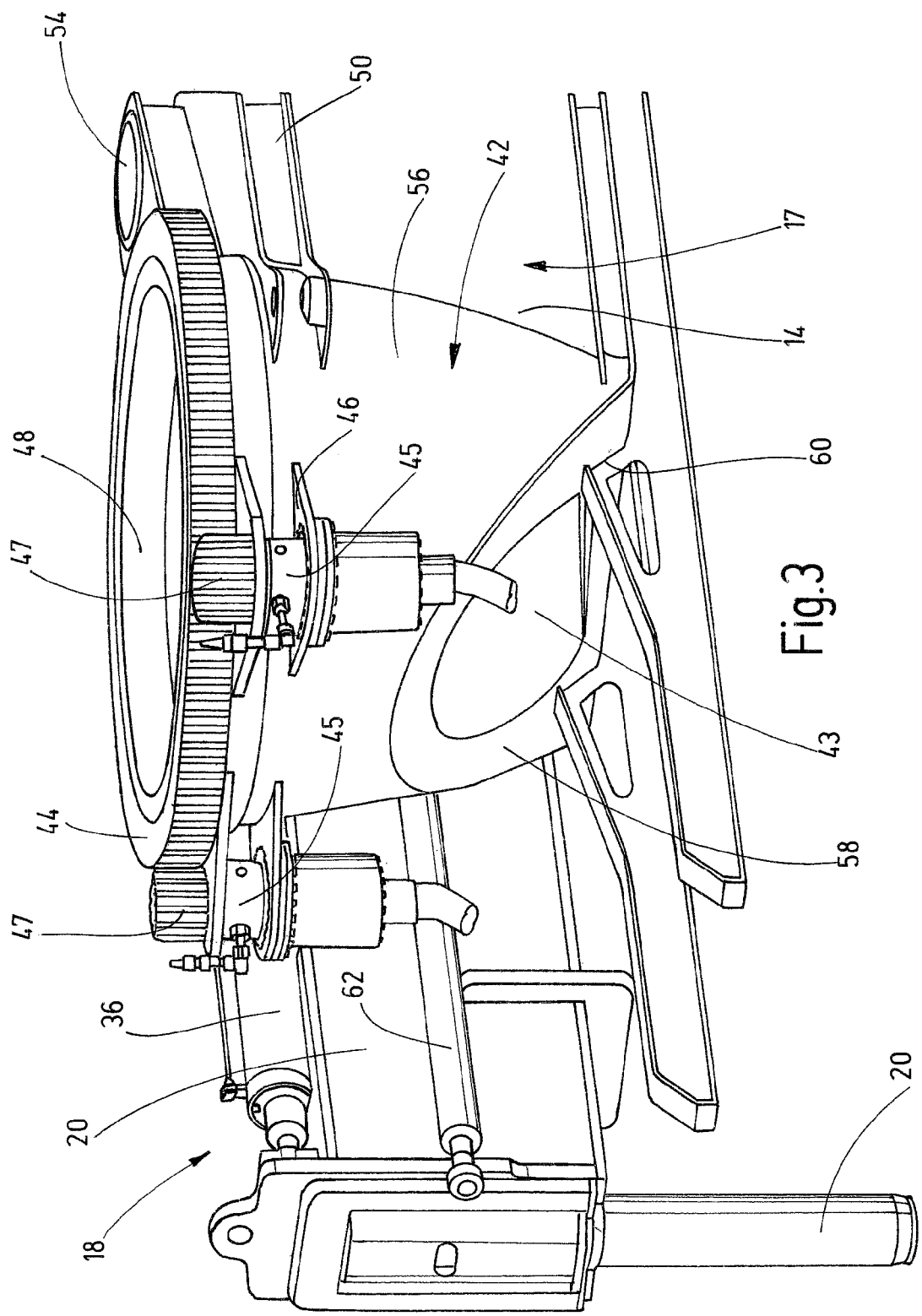

As is visible from FIGS. 2 and 3, moreover, the bearing arms 50 forming part of the support structure 17 are welded onto the shell 42, said bearing arms having bearing eyes 52, 54 arranged spaced apart from the shell wall, in each case one of the support legs 20, 22, 22' being pivotably mounted thereon about a vertical axis.

As is visible from FIGS. 2 and 3, a further particularity of this disclosure is that the shell wall 56, which forms a truncated cone, forms an abutment surface 58 which is open downwardly and rises obliquely in the direction of travel of the concrete pump and which is supported on a support frame 60 of the support structure 17 rising obliquely in the direction of travel. This results in an additional saving of weight.

In summary, the following is to be noted: this disclosure relates to a mobile concrete pump with a support structure 17 which can be placed on a vehicle frame 10 of a truck chassis for receiving functional units which form a support device 18 and a distributing boom 15, wherein the functional unit which forms the distributing boom 15 has a rotary head 19 mounted on a boom pedestal 14 in a rotatable manner about a vertical axis, said boom pedestal being secured to the support structure, and the boom pedestal 14 comprises a shell 42 which engages in the support structure 17 and is provided as a rotary bearing 48 for the rotary head 19, and wherein the functional units forming the support device 18 have one respective support leg 20, 22, 22' mounted in a bearing 52, 54 in a pivotable and/or telescopable manner, said bearing being secured to the support structure. A particularity of this disclosure is that the shell 42, with a shell wall 56 which tapers in cross section from top to bottom in the manner of a truncated cone or truncated pyramid, engages in the support structure 17 and is rigidly inserted therein, preferably is welded therein.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMERALS

10 Vehicle frame
11 Front axle
12 Rear axle
13 Driver's cab
14 Boom pedestal
15 Concrete distributing boom
16 Pump arrangement
17 Support structure
18 Support device
19 Rotary head
20 Front support legs
22, 22' Rear support legs
24 Vehicle longitudinal axis
26, 28 Foot parts
30 Ground
32, 34 Vertical pivot axes
36 Extension cylinder
38 Strut body
40 Telescopic part
42 Shell
43 Through-opening
44 Toothed ring
45 Drive motor
46 Lugs
47 Drive pinion
48 Rotary bearing
50 Bearing arms
52, 54 Bearing eyes (bearings)
56 Shell wall
58 Abutment surface
60 Support frame
62 Telescopic cylinder
F Direction of travel

What is claimed is:

1. A mobile concrete pump, comprising:
a support structure configured for placement on a vehicle frame of a truck chassis;
a boom pedestal secured to the support structure;
a distributing boom rotatably mounted about a vertical axis on the boom pedestal via a rotary head;
a shell which engages in the support structure, the shell comprising a rotary bearing for the rotary head;
a bearing secured to the support structure; and
a support leg mounted in the bearing;
wherein the shell has a shell wall which tapers from top to bottom in the shape of a truncated cone or truncated pyramid, engages in the support structure and is rigidly inserted therein.

2. The concrete pump as claimed in claim 1, wherein the shell has a vertical through-opening for the passage of a concrete conveying line.

3. The concrete pump as claimed in claim 1, further comprising a bearing arm welded onto the shell, the bearing being arranged on the bearing arm and being spaced apart from the shell wall, the support leg being pivotably mounted in the bearing about a vertical axis.

4. The concrete pump as claimed in claim 3, wherein the bearing comprises two bearings spaced apart and the support leg comprises two support legs, each of the support legs being pivotably mounted to a respective one of the bearings.

5. The concrete pump as claimed in claim 1, wherein the shell wall forms a truncated cone or a truncated pyramid with an abutment surface which is open downwardly and rises obliquely in the direction of travel of the concrete pump.

6. The concrete pump as claimed in claim 5, wherein the shell is supported by the oblique abutment surface on a support frame of the support structure rising obliquely in the direction of travel.

7. The concrete pump as claimed in claim 1, wherein the support leg comprises a front support leg having a plurality of telescopic members and a cylinder connected thereto, the cylinder being arranged between the front support leg and the conical shell in a free space delimited in part by the conical shell.

8. The concrete pump as claimed in claim 7, wherein the front support leg comprises two front support legs and the cylinder comprises two cylinders, each cylinder being arranged between a respective one of the front support legs and the conical shell in the free space.

* * * * *